Figure 1:
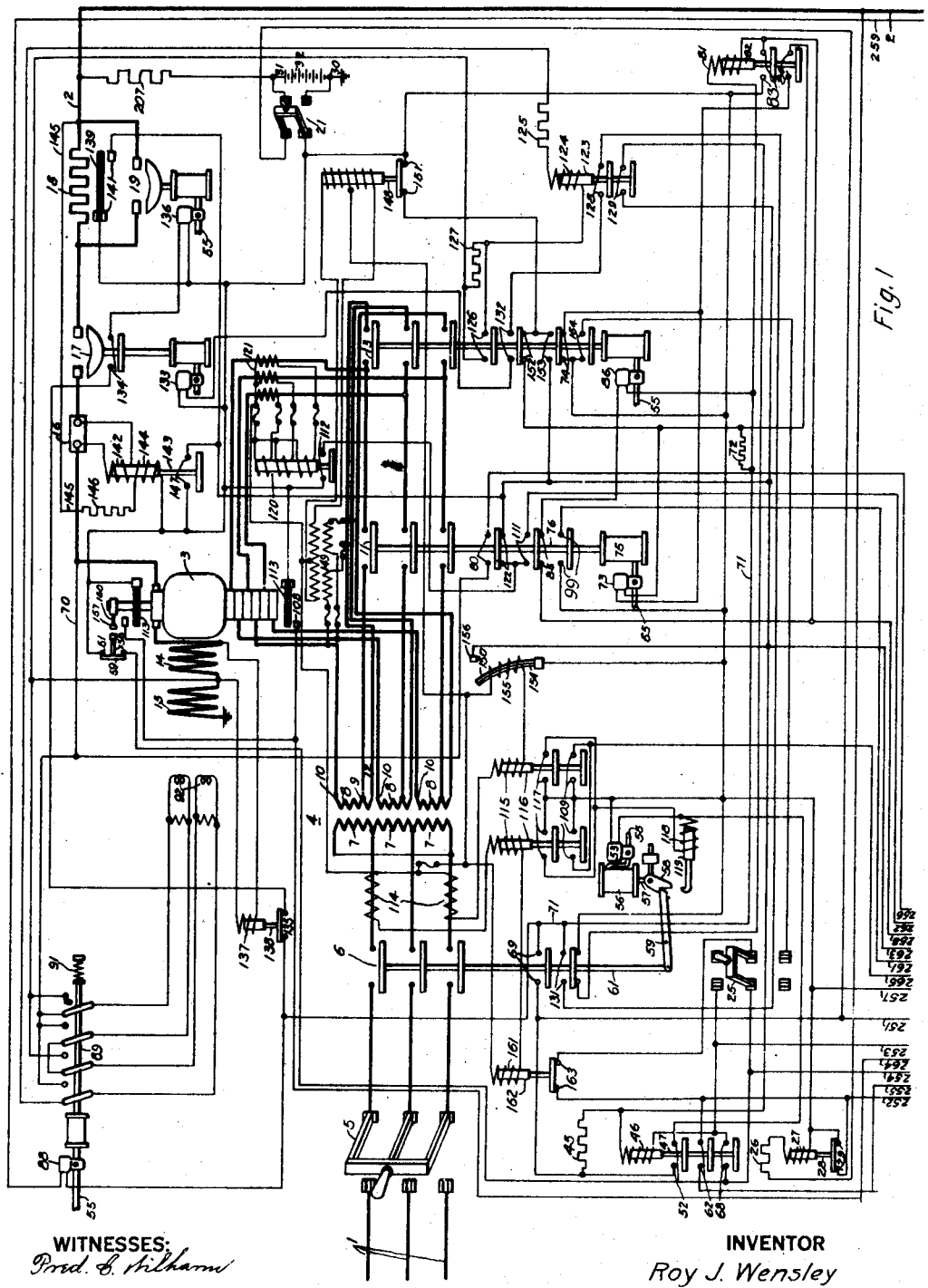

Dec. 18, 1928.  
R. J. WENSLEY  
1,695,906  
PNEUMATICALLY OPERATED STATION  
Filed Oct. 1, 1923  
3 Sheets-Sheet 1

WITNESSES:  
INVENTOR  
Roy J. Wensley  
BY  
ATTORNEY

Dec. 18, 1928.  
R. J. WENSLEY  
1,695,906  
PNEUMATICALLY OPERATED STATION  
Filed Oct. 1, 1923  3 Sheets-Sheet 2

WITNESSES:  
R. J. Butler  
A. H. Pendleton

INVENTOR  
Roy J. Wensley.  
BY  
Wesley G. Carr  
ATTORNEY

Dec. 18, 1928. 1,695,906
R. J. WENSLEY
PNEUMATICALLY OPERATED STATION
Filed Oct. 1, 1923  3 Sheets-Sheet 3

WITNESSES: INVENTOR
Roy J. Wensley
BY
ATTORNEY

Patented Dec. 18, 1928.

1,695,906

UNITED STATES PATENT OFFICE.

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA.

PNEUMATICALLY-OPERATED STATION.

Application filed October 1, 1923. Serial No. 665,842.

My invention relates to automatic stations and particularly to such stations in which the apparatus is pneumatically controlled.

One object of my invention is to provide an automatic station, of the above-indicated character, that shall have a plurality of relay controlled, penumatically-operated circuit interrupters for automatically starting and connecting a converter to a circuit under predetermined conditions.

Another object of my invention is to provide means whereby the polarity of a converter may be accurately and automatically controlled by pneumatic means.

Another object of my invention is to provide a station, of the above-indicated character, in which automatic means are provided for maintaining a supply of pneumatic energy for the purpose of operating the circuit interrupters.

A further object of my invention is to provide an automatic station, of the above-indicated character, that shall be simple to construct and efficient in its operation.

In practicing my invention, I provide an alternating-current circuit, a direct-current circuit, a synchronous converter, a transformer and a plurality of relay-controlled, pneumatically-operated circuit interrupters for automatically starting the converter from the alternating-current circuit through the transformer and for controlling the connection of the synchronous converter to the direct-current circuit.

I further provide a system of relays for so controlling the pneumatically-operated circuit interrupters as to normally maintain connection between the direct current distribution circuit and a plurality of feeder circuits, but to disconnect any feeder circuit in which short-circuit conditions exist. Protective devices for the purpose of preventing damage to the apparatus within the substation during its operation and an electrically-operated air compressor for the purpose of maintaining a supply of pneumatic energy for operating the pneumatically-controlled circuit interrupters are provided.

In the prior art, it has been customary to use a plurality of magnetically-operated switches in which the switch-operating magnet coils receive energy from a transformer that is connected to the alternating current supply circuit. In order that energy shall be available for operating the controlling means at all times, it is necessary that this transformer be connected outside of the supply-circuit protective apparatus, and consequently, only a small measure of protection can be afforded to the transformer circuit.

In my invention, the energy for operating the circuit interrupters is received from a pneumatic energy supply which is maintained by a motor-driven compressor that is connected to the direct-current distribution circuit. Furthermore, the circuit interrupters are of the well-known standard railway type, which do not require large electromagnets for their operation.

Figure 2:
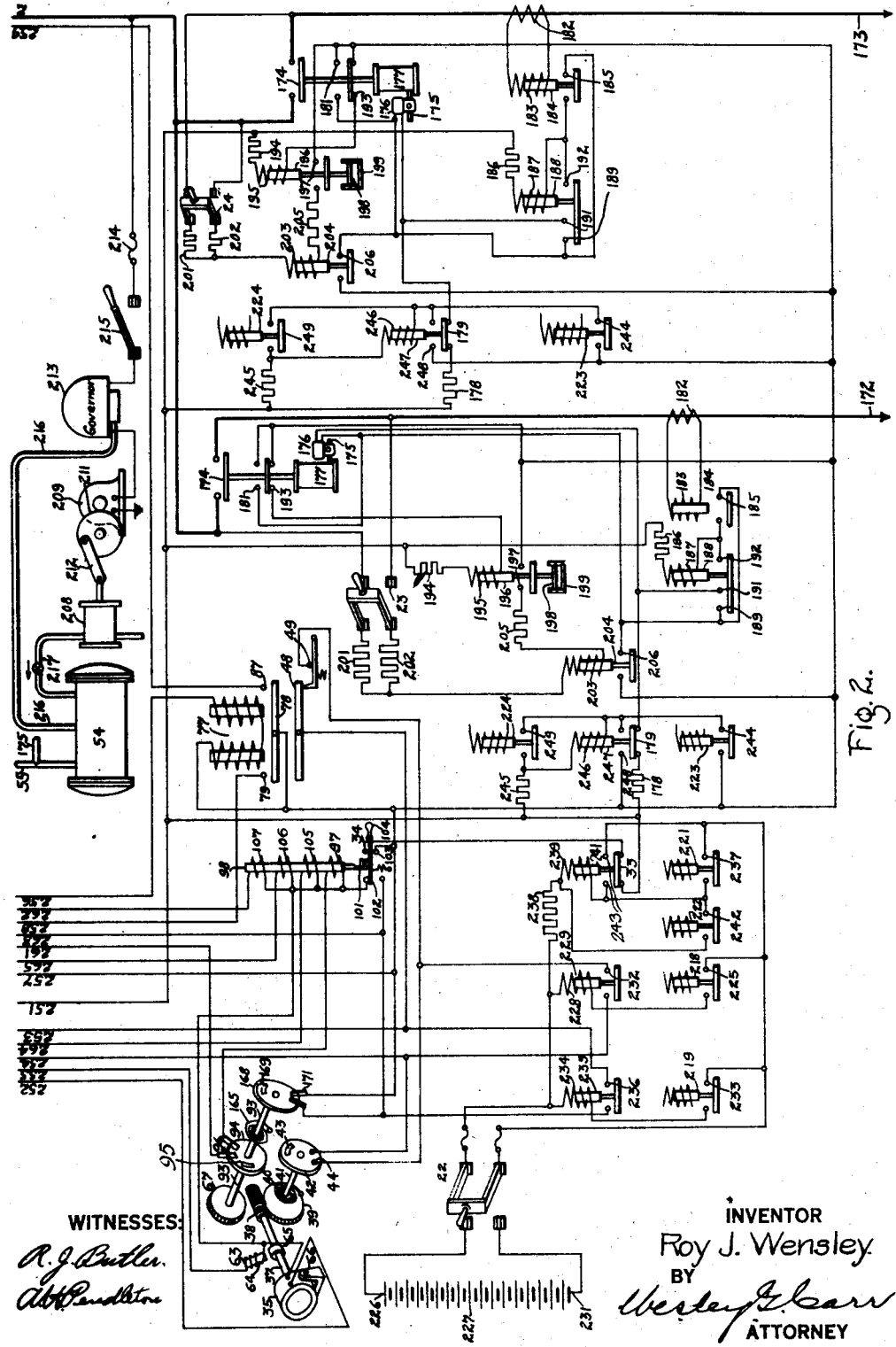

In the accompanying drawings;

Figures 1 and 2, combined, are a diagrammatic representation of circuits and the apparatus embodying my invention.

Figure 3:
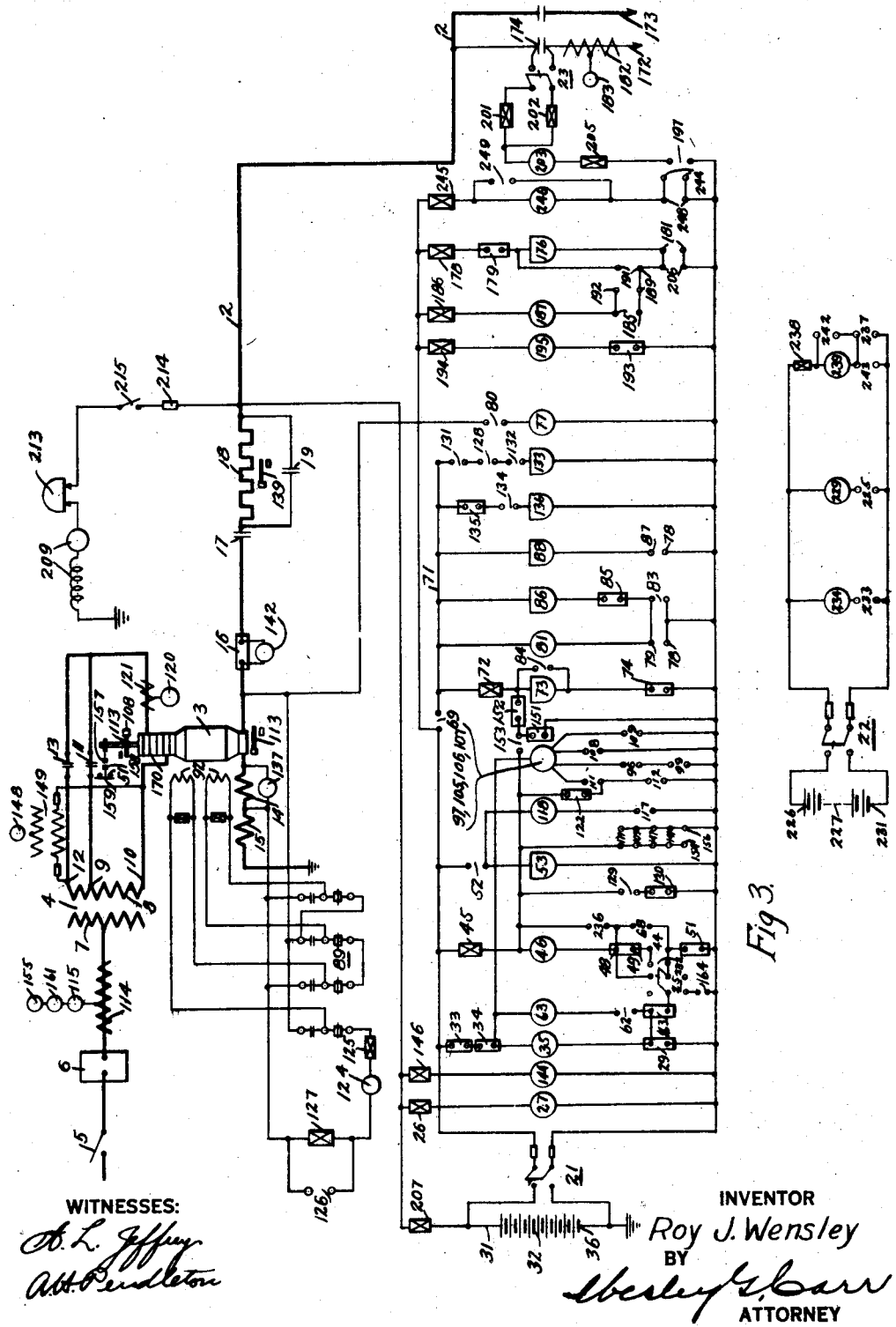

Fig. 3 is a schematic representation of the circuits shown in Figs. 1 and 2.

An electrical system embodying my invention comprises, in general, an alternating current supply circuit 1, a direct-current distribution circuit 2, and a synchronous converter 3 operatively connected between the circuits. A transformer 4 is provided for the purpose of reducing the voltage of the supply circuit 1 to a value suitable for operation of the converter 3. The conductors of the supply circuit 1 are connected through a disconnecting switch 5 and a circuit interrupter 6 to the primary windings 7 of the transformer 4. One set of terminals 10 of the secondary windings 8, of the transformer 4, is connected to certain of the slip-rings of the converter 3.

The starting terminals 9 of the windings 8 are connected to the starting switch 11 and the running terminals 12 are connected to the running switch 13. The remaining terminals of the switches 11 and 13 are connected to the remaining slip-rings of the converter 3. The negative terminal of the direct-current circuit of the converter 3 is connected through a commutating field-magnet winding 14 and a series field-magnet winding 15 to ground. The positive terminal is connected through a shunt 16, a circuit interrupter 17 and either a resistor 18 or a circuit interrupter 19 to the direct-current distribution circuit 2.

With the substation apparatus in condition for automatic operation, hand-operated switches 5, 21, 22, 23 and 24 are closed and the switch 25 is closed in the lower position indicated in the diagram. Current then traverses the circuit extending from the distribution circuit 2 through a resistor 26, the operating coil 27 of an under-voltage relay 28, and the switch 21 to ground, thereby energizing the coil 27. If the voltage between the conductor 2 and ground is sufficient to hold the movable member of the relay 28 in its upper position, the circuit through contact members 29 will not be completed and the circuits through the storage battery 32 and the polarizing coil 144 of a relay 143 are the only circuits completed. This condition corresponds to the light-load condition of the distribution circuit when its voltage is above a predetermined minimum value.

When the voltage falls below this predetermined minimum value, the energization of the coil 27 is no longer sufficient to hold the movable member of the relay 28 in its upper position and it falls to effect engagement between the contact members 29. This completes an electrical circuit extending from the positive terminal 31 of the storage battery 32 through the switch 21, a conductor 251, contact members 33 of a relay 241, contact members 34 of a lock-out relay 98, a motor 35, a conductor 252, contact members 29, and switch 21 to the negative terminal 36 of the storage battery 32, which is also connected to ground. The motor 35 thus actuates through a shaft 37, a worm 38, a worm-wheel 39, and a shaft 41 an insulating disc 42, upon which an electrical conducting member 43 is mounted.

If the voltage between the circuit 2 and ground remains below the predetermined minimum value for a predetermined interval of time, for example, five seconds, the conducting member 43 engages the contact members 44. This completes an electrical circuit extending from the positive terminal 31 of the storage battery 32 through the switch 21, resistor 45, operating coil 46 of the relay 47, conductor 253, contact members 48 and 49 of a polarized relay 77, contact members 44, conductor 254, contact members 51 of an overspeed device 170, and switch 21 to the negative terminal 36 of the storage battery 32, thereby energizing the coil 46 to cause the movable member of the relay 47 to move to its upper position.

Electrical connection is thus made between the contact members 52 which completes an electrical circuit extending from the positive terminal 31 of the storage battery 32 through the switch 21, contact members 52, the operating coil of a magnet-valve 53 and switch 21 to the negative terminal 36 of the storage battery 32. With the coil of the magnet-valve 53 thus energized, the valve is open and air is permitted to pass from a reservoir 54 through a pipe 55 and the valve 53 into a cylinder 56. Pneumatic pressure is thus brought to bear on a piston within the cylinder 56 and is transmitted through a piston rod 57, latch member 58, and lever 59 to a rod 61 that actuates the circuit interrupter 6. When the circuit interrupter 6 is thus closed, current traverses the circuit extending from the supply circuit 1 through the disconnecting switch 5 and the circuit interrupter 6 to the primary windings 7 of the transformer 4.

The closing of the relay 47 also effects engagement of the contact members 62, thus completing a circuit extending from the positive terminal 31 of the storage battery 32 through the switch 21, conductor 251, contact members 33, contact members 34, operating coil 63 of an electromagnet 64, conductor 255, contact members 62, contact members 29, and switch 21 to the negative terminal 36 of the storage battery 32. When the electromagnet 63 is thus energized it attracts its armature member 65, which turns the shaft 37 about the axis of the trunnions 66, thereby moving the worm 38 out of engagement with the worm-wheel 39 and into engagement with the worm-wheel 67, and permitting the spring 40 to return the shaft 41 to its original position.

When the relay 47 closes, a third set of contact members 68 is engaged, thereby shunting the contact members 48 and 49 and the contact members 44. This connection serves to keep the coil 46 energized after the contact members 48 and 49 and the contact members 44 are disengaged.

The closing of the circuit interrupter 6 also effects engagement of the contact members 69 and thereby connects a conductor 71 to the positive terminal 31 of the storage battery 32 through the switch 21. This completes a circuit extending from the positive terminal 31 of the storage battery 32 through the contact member 69, a resistor 72, the operating coil of a magnet-valve 73, auxiliary contact members 74 of the circuit interrupter 13, and switch 21 to the negative terminal 36 of the storage battery 32. When the operating coil of the magnet-valve 73 is thus energized, the valve is opened to permit air to pass from the reservoir 54 through the pipe 55 and the valve 73 into an operating cylinder 75 of the circuit interrupter 11. Pneumatic pressure, acting on a piston within the cylinder 75, is transmitted to a rod 76 which closes the circuit interrupter 11, thereby completing an electrical circuit extending from the starting terminals 9 of the transformer 4 through the circuit interrupter 11 and the converter 3 to the terminals 10 of the secondary windings 8 of the transformer 4. The converter 3 is thus started on a reduced voltage and runs in this manner until a predetermined speed is attained.

If the polarity of the direct-current circuit of the converter 3 is correct, the polarized relay 77 will be actuated by current traversing the circuit extending from the positive terminal of the converter 3, through the auxiliary contact members 80 of the interrupter 11, conductor 256, operating coils of the relay 77, conductor 257, and switch 21 to ground so as to disengage the contact members 48 and 49 and bring the contact members 78 and 79 into engagement. This completes an electrical circuit extending from the positive terminal 31 of the storage battery 32 through the switch 21, contact members 69, conductor 71, operating coil 81 of a transfer relay 82, conductor 258, contact members 78 and 79, conductor 257, and switch 21 to the negative terminal 36 of the storage battery 32.

The relay 82 is now energized and its movable member is actuated to its upper position to effect engagement of the contact members 83 and 84, respectively. The contact members 83 so shunt the contact members 78 and 79 as to maintain energization of the coil 81 after the contact members 78 and 79 are disengaged. The contact members 84 so shunt the operating coil of the magnet-valve 73 that it is de-energized and permits the valve to close. This causes the circuit interrupter 11 to open and effect engagement of the auxiliary contact members 85. This operation completes an electrical circuit extending from the positive terminal 31 of the storage battery 32 through the switch 21, contact members 69, operating coil of a magnet-valve 86, contact members 85, contact members 83 and switch 21 to the negative terminal 36 of the storage battery 32.

The operating coil of the magnet-valve 86 is thus energized to open the valve 86, permitting pneumatic pressure to effect closing of the circuit interrupter 13 in a similar manner to that previously described with respect to the circuit interrupter 11. The closing of the circuit interrupter 13 completes a circuit extending from the running terminals 12 of the transformer 4 through the circuit interrupter 13 and converter 3 back to the terminals 10 of the secondary windings 8 of the transformer 4. This operation applies full secondary voltage to the converter 3 and starts it in normal operation.

In the event that the converter 3 starts on reduced voltage with the wrong polarity, the polarized relay 77 is so actuated as to effect engagement of the contact members 78 and 87, which completes an electrical circuit extending from the positive terminal 31 of the storage battery 32 through the switch 21, contact members 69, conductor 71, operating coil of a magnet-valve 88, conductor 259, contact members 87 and 78, conductor 257, and the switch 21 to the negative terminal 36 of the storage battery 32.

The magnet-valve 88 is thereby opened to permit pneumatic pressure to actuate a field-reversing switch 89 against the pressure of a spring 91 in a manner similar to that described with respect to the operation of the other pneumatic switches. This establishes a circuit extending from the positive terminal of the converter 3 through the switch 89 and the shunt field-magnet windings 92 of the converter 3 back to the negative terminal of the converter. Current now traverses the field-magnet windings 92 in the opposite direction to that which it previously traversed when the switch 89 was in its normal or de-energized position.

Furthermore, the two shunt field-magnet windings 92 are now connected in parallel with respect to each other instead of in series relation as formerly, and therefore they are traversed by a current of greater magnitude, which rapidly overcomes the incorrect polarity of the converter 3 and establishes correct polarity. The polarized relay 77 is then so actuated as to effect engagement of the contact members 78 and 79; the operating coil of the valve magnet 88 is de-energized by reason of the disengagement of the contact members 87 and 78; the switch 89 is thereby returned to its normal position, as shown in the diagram, by the force of the spring 91, and the converter 3 continues in operation with the correct polarity.

Until the converter attains correct polarity, the circuit interrupter 13 will not be permitted to close and operation will be effected only by means of current traversing the circuit extending through the starting circuit interrupter 11. In the event that this operation continues over a predetermined interval of time after the energization of the coil 63, the worm-wheel 67, shaft 93, and insulating disc 94 will be rotated through such a degree that an electrical conducting member 95 thereon will engage contact members 96, thereby completing a circuit extending from the positive terminal 31 of the storage battery 32 through the switch 21, conductor 251, contact members 33, contact members 34, operating coil 97 of the relay 98, contact members 96, conductor 261, auxiliary contact members 99 of the interrupter 11, and switch 21 to the negative terminal 36 of the storage battery 32.

Current traversing this circuit energizes the operating coil 97, which so actuates the relay 98 as to disengage a latch 101 to permit a bridging member 102 to drop, thereby disengaging the contact members 34 and engaging the contact members 103. The engagement of the contact members 103 completes a circuit shunting the operating coil 46 of the relay 47, permitting this relay to assume its de-energized position. This operation interrupts the circuit extending through the operating coil of the magnet-valve 53 which controls the operation of the circuit interrupter 6.

The supply of pneumatic energy to the cylinder 56 is thus interrupted and the circuit interrupter 6 is permitted to open, thereby interrupting the circuit extending from the supply circuit 1 to the primary windings 7 of the transformer 4 and precluding further operation of the converter 3 until the bridging member 102 is manually returned to its normal position, as shown in the diagram, by means of an operating handle 104.

This condition, known as the lock-out condition of the substation apparatus, is also effected in similar manner by means of the energization of any of the other three operating coils 105, 106 or 107 of the relay 98 in response to the engagement of contact members 108, 109 or 111 and 113 simultaneously, respectively. The contact members 108 are connected by the action of either of the bimetallic strips 113, should the temperature of either of the converter bearings exceed a predetermined degree, such that further operation of the converter would damage the bearings.

Electrical engagement of the contact members 109 is effected in the event that current in excess of a predetermined value traverses any phase of the supply circuit 1. This is accomplished by the series transformers 114 which supply energy to the operating coils 115 of the alternating current overload relays 116. When the amount of energy supplied to these coils exceeds a predetermined value, corresponding to a predetermined current traversing the supply circuit 1, either or both of the relays 116 will be actuated to effect engagement of the contact members 109.

The same operation effects engagement of the contact members 117 of the alternating-current overload relays 116, which completes an electrical circuit extending from the positive terminal 31 of the storage battery 32 through the switch 21, contact members 52, tripping coil 118 of the circuit interrupter 6, contact members 117, and switch 21 to the negative terminal 36 of the storage battery 32. When the tripping coil 118 is thus energized it so attracts its armature member 119 as to disengage the latch 58 from the lever 59 and permit the circuit interrupter 6 to open very quickly. This quick opening of the circuit interrupter 6 affords protection to the substation apparatus against heavy overloads in the supply circuit 1.

In the event that unbalanced currents traverse the various phases of the supply circuit 1 and the converter 3 during the period when the converter is being started, a relay 120 will be so actuated by the energization of its interconnected operating coils from series transformers 121 as to effect engagement of the contact members 112, thereby completing an electrical circuit extending from the positive terminal 31 of the storage battery 32, through the switch 21, conductor 251, contact members 33, contact members 34, operating coil 107 of the relay 98, conductor 262, contact members 111, contact members 112, and switch 21 to the negative terminal 36 of the storage battery 32, thereby actuating the relay 98 to lock the substation apparatus out of service in a manner similar to that previously described.

Should unbalanced currents traverse the various phases of the windings of the converter 3 during its normal operation, the relay 120 will be actuated in the same manner as previously described, but inasmuch as the contact members 111 are not in engagement, the substation apparatus will not be locked out of service. A circuit shunting the operating coil 46 of the relay 47 will be completed, however, through the contact members 122, 112, 51 and 66, and the operation of the converter 3 will be stopped in a manner similar to that described with respect to the engagement of the contact members 103. The substation apparatus is then in condition for restarting under normal conditions, but if the current unbalance in the various phases still persists, the apparatus will be locked out of service, as described above, during the starting period.

Assuming that the converter 3 has started in operation under normal conditions with correct polarity, the current traversing the shunt field windings 92 increases as the terminal voltage of the converter increases, until it is sufficient to actuate a field-current relay 123, by reason of the energization of an operating coil 124, which is effected by current traversing the circuit extending from the positive terminal of the converter 3 through the switch 89, shunt field-magnet windings 92, switch 89, resistor 125, operating coil 124, and contact members 126 to the negative terminal of the converter 3.

The actuation of the relay 123 effects engagement of the contact members 128 and 129 respectively. The engagement of the contact members 128 completes an electrical circuit extending from the positive terminal 31 of the storage battery 32 through the switch 21, contact members 69, conductor 71, auxiliary contact members 131 of the circuit interrupter 6, contact members 128, auxiliary contact members 132 of the circuit interrupter 13, operating coil of a magnet-valve 133 of the circuit interrupter 17, and the switch 21 to the negative terminal 36 of the storage battery 32. The circuit interrupter 17 is thereby pneumatically actuated in a manner similar to that described above with respect to the other pneumatically-operated circuit interrupters, and the positive terminal of the converter 3 is thereby connected through the shunt 16, the circuit interrupter 17, and the resistor 18 to the distribution circuit 2.

At the same time, electrical connection is made between auxiliary contact members 134, which completes a circuit extending from the positive terminal 31 of the storage battery 32 through the switch 21, contact members 69, conductor 71, contact members 135 of a direct current overload relay 138, contact members 134, operating coil of a magnet-valve of the circuit interrupter 19, and the switch 21 to the negative terminal 36 of the storage battery 32. The operating coil of the magnet-valve 136 is thus energized, and the circuit interrupter 19 is pneumatically actuated in a manner similar to that described above with respect to the other pneumatically-operated circuit interrupters, and a circuit shunting the resistor 18 is completed.

In the event that the current traversing the direct current windings of the converter 3 exceeds a predetermined value, the drop in potential in the commutating field-magnet winding 14 will be such as to so energize the operating coil 137 of the relay 138 as to actuate the relay 138 to disengage the contact members 135. This interrupts the circuit extending through the operating coil of the magnet-valve 136, thereby deenergizing this coil to permit the circuit interrupter 19 to open. This operation so reinserts the resistor 18 in the circuit between the positive terminal of the converter 3 and the distribution circuit 2 as to increase the total resistance of the direct-current circuit and thereby reduce the amount of current that can traverse this circuit.

In case the current traversing the direct-current circuit exceeds a predetermined value, the resistor 18 will be heated to such a degree that an adjacent bimetallic member 139 will be deflected sufficiently to effect engagement of its contact members 141. This completes a circuit shunting the operating coil 46 of the relay 47 and stops the operation of the substation apparatus in a manner similar to that previously described.

Restarting of the substation apparatus is precluded until the temperature of the bimetallic member 139 falls to such a degree that electrical connection is broken between the contact members 141, when the operating coil 46 of the relay 47 will no longer be short-circuited.

If, for any reason, the direct-current circuit of the converter 3 is traversed by a current in the reverse of normal direction, the current traversing the circuit extending through the shunt 16 and the operating coil 142 of a reverse-current relay 143, will be such as to establish a flux in the same direction as that established by the current traversing the polarizing coil 144. This polarizing coil is energized by current traversing the circuit extending from the distribution circuit 2 through a conductor 145, a resistor 146, the coil 144 and the switch 21 to ground. The combined flux established by the current traversing the coils 142 and 144 so actuates the relay 143 as to effect engagement of contact members 147 shunting the operating coil 46 of the relay 47 and thereby stopping the operation of the substation apparatus in a manner similar to that previously described with respect to the operation of the bimetallic member 139.

In the event that any of the phases of the supply circuit 1 become relatively reversed, or that the voltage of the supply circuit 1 falls below a predetermined value, the energy supplied to the operating coils of a reverse-phase and low-voltage relay 148 from a potential transformer 149 will not be sufficient to hold the movable member of the relay 148 in its upper position and it will drop to effect engagement of its contact members 151. If this condition occurs during the starting period of the converter 3, a circuit is completed extending from the positive terminal 31 of the storage battery 32 through switch 21, contact members 69, conductor 71, resistor 72, auxiliary contact members 152 of the interrupter 13, which are engaged when the interrupter is in its open position, contact members 151, and switch 21 to the negative terminal 36 of the storage battery 32. The operating coil of the magnet-valve 73, which controls the operation of the circuit interrupter 11, is thus shunted by the circuit extending through the contact members 152 and 151 and the circuit interrupter 11 will thereby be opened.

If the movable member of the relay 148 drops to its lower position, by reason of a relative phase reversal of abnormal reduction of voltage in the supply circuit 1 as described above, during the normal running period of the converter 3, when the circuit interrupter 13 is closed, the contact members 152 will be disengaged, but the contact members 153 will be engaged. The operation of the relay 148 effects engagement of the contact members 151 to complete an electrical circuit shunting the operating coil 46 of the relay 47. This stops the operation of the substation apparatus in a manner similar to that described previously with respect to the relays 139 and 143.

A thermal relay 154 furnishes protection for the substation apparatus against continuing loads exceeding a predetermined value. This protection is obtained by means of the series transformers 114 which supply energy to the operating coil 155 of the thermal relay 154 in direct proportion to the current traversal of the supply circuit 1. The deflection of a bimetallic member 150 included in the relay 154 is dependent upon its temperature, which is proportional to the energy supplied to the coil 155. If this energy exceeds a predetermined value over a predetermined interval of time, the bimetallic member 150 will be sufficiently deflected to engage a contact member 156, thereby completing a circuit which shunts the operating coil 46 of the relay 47 and stops the operation of the substation apparatus in the same manner as described above with respect to the relays 139 and 143.

A centrifugal device 157 is attached to the shaft of the converter 3 through a spring 160 in such a manner that, if the speed of the converter exceeds a predetermined value, the member 157 will engage a stem 158 to force a bridging member 159 out of electrical engagement with the contact members 51. The breaking of electrical connection between the contact members 51 interrupts the circuit extending through the operating coil 46 of the relay 47 and thereby permits this relay to assume its de-energized position. This stops the operation of the substation apparatus by interrupting the circuit that supplies energy to the operating coil of the magnet-valve 53 that controls the operation of the circuit interrupter 6.

The various protective features provided for the substation apparatus during the starting and running of the converter 3 have now been fully described. It will now be assumed that the converter 3 has been normally started in operation in response to a reduction of voltage in the distribution circuit 2, and that it has been operating normally so as to supply direct-current energy to the distribution circuit 2 during an interval of time. These conditions correspond, in a railway substation, to the approach of a car to the vicinity of the substation, so that the operating energy which the car takes from the distribution circuit causes a reduction of voltage in the distribution circuit. Assuming that the car has now moved away from the vicinity of the substation and that the current traversing the distribution circuit 2 has thereby fallen below a predetermined value, the current traversing the supply circuit 1 will be proportionately decreased. The energy supplied by the series transformers 114 to the operating coil 161 of a relay 162 will be likewise decreased. When the energization of the operating coil 161 of the relay 162 decreases below a predetermined value, the movable member of the relay 162 drops to its lower position to effect engagement of its contact members 163, which completes an electrical circuit extending from the positive terminal 31 of the storage battery 32, through the switch 21, conductor 251, contact members 33, contact members 34, motor 35, the operating coil 63 of the electromagnet 64 and the contact members 62 in parallel with the motor 35, contact members 163, switch 25, contact members 164, and switch 21 to the negative terminal 36 of the storage battery 32.

The motor 35 and operating coil 63 of the electromagnet 64, have been de-energized since the voltage of the distribution circuit 2 was restored to its normal value by the starting of the converter 3 in operation, and the resultant energization of the operating coil 27 of the relay 28 become sufficient to lift the movable member of the relay 28 to disengage the contact members 29. During this time, the worm 38 has been out of engagement with the worm-wheel 67, thereby permitting the spring 165 to return the shaft 93 to its original position. The motor 35 and the coil 63 are now re-energized by reason of the engagement of the contact members 163. This starts the motor 35, and as the electromagnet 64 holds the worm 38 in engagement with the worm-wheel 67, the shaft 37, worm 38, worm-wheel 67, shaft 93, and insulating disc 168 are also rotated. If the light load condition persists over a predetermined interval of time, say 20 minutes, thereby permitting the movable member of the relay 162 to remain in its lower position and maintain engagement of the contact members 163, the motor 35 will have operated for a sufficient time to bring a conducting member 169 that is supported by the insulating disc 168 into engagement with its contact members 171. This operation completes a circuit shunting the operating coil 46 of the relay 47 and causes the operation of the substation apparatus to stop in the same manner as previously described with respect to the operation of the relays 139 and 143.

The cycle of automatic operation of the substation apparatus, including the operation of various protective features, has now been described in full and the substation is again in its inoperative condition, ready to respond to a reduction of voltage in the distribution circuit as before.

The apparatus embodying my invention also comprises means for individually controlling the connection of various feeder circuits to the distribution circuit 2. Figure 2 shows two such feeder circuits 172 and 173 with means for controlling their connection to the distribution circuit 2, and similar reference numerals are applied in both cases. When one of the feeder circuits, such as circuit 172, is in its normal operating condition, it is electrically connected to the distribution circuit 2 through a circuit interrupter 174, which is held in its circuit-closing position by pneumatic pressure transmitted from the reservoir 54 through a pipe 175 and a magnet-valve 176 to an operating cylinder 177 of the circuit interrupter 174.

The operating coil of the magnet-valve 176 is energized by current traversing the circuit extending from the positive terminal 31 of the storage battery 32, through the switch 21, conductor 251, resistor 178, contact members 179 of a supervisory relay 247, operating coil of the magnet-valve 176, auxiliary contact members 181 of the interrupter 174, conductor 257, and switch 21 to the negative terminal 36 of the storage battery 32.

In case of a heavy current surge in the feeder circuit 172, the changing flux set up within a series transformer 182 causes current to traverse the circuit extending through the secondary winding of this transformer and the operating coil 183 of a short-circuit detector relay 184, thereby energizing the coil 183 to cause the movable member of the relay 184 to momentarily move to its circuit-closing position with respect to the contact members 185. This completes a circuit extending from the positive terminal 31 of the storage battery 32 through the switch 21, conductor 251, resistor 186, the operating coil 187 of a holding relay 188, contact members 185, contact members 181, conductor 257, and switch 21 to the negative terminal 36 of the storage battery 32. The coil 187 is thus energized to cause the movable member of the relay 188 to effect engagement of its contact members 189, 191 and 192. Engagement of the contact members 189 and 192 so shunts the contact members 185 as to maintain energization of the coil 187 after the current surge in the feeder circuit 172 has stopped and permitted the movable member of the relay 184 to disengage the contact members 185. Engagement of the contact members 189 and 191 shunts the operating coil of the magnet-valve 176 to thereby cause this coil to be de-energized to permit the circuit interrupter 174 to return to its circuit-opening position in the same manner as that described previously with respect to the other pneumatically-operated circuit interrupters.

In the circuit-opening position of the circuit interrupter 174, its auxiliary contact members 193 are engaged, thereby completing an electrical circuit extending from the positive terminal 31 of the storage battery 32 through the switch 21, conductor 251, resistor 194, the operating coil 195 of a time-element relay 196, contact members 193, conductor 257, and switch 21 to the negative terminal 36 of the storage battery 32. The movable member of the relay 196 moves slowly to effect engagement of its contact members 197, by reason of the action of its piston 198 and dash-pot 199.

After a predetermined interval of time, therefore, engagement of the contact members 197 is effected to complete a circuit extending from the terminals of the circuit interrupter 174, through the switch 23, resistors 201 and 202 that are connected in parallel relation, the operating coil 203 of a resetting relay 204, resistor 205, contact members 197, conductor 257, and switch 21 to the negative terminal 36 of the storage battery 32.

In the event that the low resistance circuit, which caused the current surge in the feeder circuit 172, still exists, the resistor 202 will shunt sufficient current through the circuit extending from the resistor 201 through the resistor 202, switch 23, feeder circuit 172, and the circuit of low resistance, which caused the current surge, to ground, to preclude sufficient energization of the coil 203 to actuate the relay 204 to close its contact members 206. Thus the reclosing of the circuit interrupter 174 is precluded.

When the circuit of low resistance, which caused the current surge in the feeder circuit 172, is removed, a sufficiently heavy current traverses the circuit extending through the operating coil 203 to cause the relay 204 to effect engagement of the contact members 206. A circuit is thereby completed extending from the positive terminal 31 of the storage battery 32 through the switch 21, conductor 251, resistor 178, contact members 179, operating coil of the magnet-valve 176, contact members 206, conductor 257, and switch 21 to the negative terminal of the storage battery 32.

The movable member of the relay 188 having effected disengagement of the contact members 189, 191 and 192, by reason of the disengagement of the contact members 181 when the circuit interrupter 174 moved to its circuit-opening position, the operating coil of the magnet-valve 176 is no longer shunted and is now re-energized by the current traversing the circuit completed by the engagement of the contact members 206. Reclosing of the circuit interrupter 174 is now effected in the same manner as previously described.

This operation disengages the contact members 193, thereby interrupting the circuit extending through the operating coil 195 of the relay 196, and permitting the movable member of this relay to disengage the contact members 197. The feeder circuit 172 is now reconnected to the distribution circuit 2 and the controlling means are in the same condition as before the occurrence of the current surge, and are prepared for the same cycle of operation, as described above, in the event that another current surge occurs.

The storage battery 32 is maintained in an energy storing condition by current traversing the circuit extending from the circuit 2 through the resistor 207 and the storage battery 32 to ground.

A supply of pneumatic energy is maintained in the reservoir 54 by a compressor 208 that is driven by a motor 209 through gears 211 and a connecting-rod 212. The pressure of this pneumatic energy is kept between predetermined limits by the operation of a pneumatic governor 213, which is of a well-known type. The motor 209 is operated by current traversing the circuit extending from the distribution circuit 2 through a fuse 214, a switch 215, that is normally closed, a governor 213 and the motor 209 to ground. The construction of the governor 213 is such that the pneumatic pressure transmitted from the reservoir 54 through a pipe 216 to the governor controls the making of electrical connection between the switch 215 and the motor 209.

If the pneumatic pressure falls below a predetermined minimum value while the compressor 208 is not in operation, the governor 213 completes an electrical circuit between the switch 215 and the motor 209, thereby starting the motor 209, which operates the compressor 208 until the pneumatic pressure rises above a predetermined maximum, when the governor 213 opens the electrical circuit between the switch 215 and the motor 209 to stop the operation of the motor and the compressor.

Thus the pneumatic pressure in the reservoir 54 is automatically maintained between certain predetermined limits, which may be varied by properly adjusting the mechanism of the governor 213. Air is prevented from passing from the reservoir 54 into the compressor 208, during the time when the compressor is not operating, by a check valve 217.

The system embodying my invention, in addition to being adapted to operate automatically as described above, is also capable of being partially or completely controlled from a remote point. The controlling means of the substation apparatus may be operated from a remote point by transmitting a code of electrical impulses over a two-wire circuit provided for that purpose, to a selector switch the mechanical construction of which may be similar to that shown in Patent No. 1,107,153, E. E. Clement, issued Aug. 11, 1914. The circuits of a selector switch of this type for controlling power apparatus are shown in the copending application of Wensley et al., Serial No. 640,001, filed May 19, 1923, and assigned to the Westinghouse Electric & Manufacturing Company. This selector switch is adapted to control the energization of the operating coil of any one of the series of relays 218, 219, 221, 222, 223 and 224 in response to the proper code of impulses transmitted from the remote point, in a similar manner to that shown in the above-identified application.

Operation of the converter 3 is initiated by transmitting the proper code of impulses to cause the energization of the operating coil of the relay 218. This effects engagement of its contact members 225, which completes an electrical circuit extending from the positive terminal 226 of a storage battery 227 through the switch 22, the operating coil 228 of a relay 229, contact members 225 and switch 22 to the negative terminal 231 of the storage battery 227, thereby energizing the coil 228 to cause the relay 229 to effect engagement of the contact members 232. These contact members shunt the contact members 44 and when they are engaged, the operation of the converter 3 is started in the same manner as though the operation had been initiated by the engagement of the control members 44, as previously described.

The operation of the converter 3 may be stopped at any time by transmitting the proper code of impulses to cause the selector switch to close a circuit which will cause the operating coil of the relay 219 to be energized. When the operating coil of this relay is energized, engagement of the contact members 233 is effected to complete a circuit extending from the positive terminal 226 of the storage battery 227 through the switch 22, operating coil 234 of the relay 235, contact members 233 and switch 22 to the negative terminal 231 of the storage battery 227. The energization of the coil 234 causes the relay 235 to effect engagement of the contact members 236 which shunt the operating coil 46 of the relay 47. The operating coil 46 is thus deenergized and the movable member of the relay 47 moves to its circuit-opening position, thereby stopping operation of the converter 3 in the same manner as described with respect to the automatic control of the substation apparatus.

If it is desired to lock the substation apparatus out of service, a code of impulses is transmitted that so actuates the selector switch as to cause the operating coil of a relay 221 to be energized. When this coil is energized, engagement of the contact members 237 is effected and an electrical circuit extending from the positive terminal 226 of the storage battery 227 through the switch 22, resistor 238, operating coil 239 of the relay 241, contact members 237, and switch 22 to the negative terminal 231 of the storage battery 227 is completed. The operating coil 239 is thus energized to cause the relay 241 to effect disengagement of the contact members 33 and engagement of the contact members 243. Engagement of the contact members 243 completes a circuit shunting the contact members 237, and maintains the energization of the coil 239 after the contact members 237 are disengaged.

Disengagement of the contact members 33 interrupts the circuits extending through the motor 35 and operating coil 63 of the electromagnet 64, thereby preventing the controlling means of the substation apparatus from functioning, as previously described, so as to start the operation of the converter 3.

When it is desired to put the substation apparatus in condition for further operation, such a code of impulses is transmitted to the selector switch that it causes the operating coil af the relay 222 to be energized. This effects engagement of the contact members 242, which shunt the operating coil 239 of the relay 241. The operating coil 239 is thereby de-energized and the relay 241 is permitted to engage its contact members 33, and disengage its contact members 243. The apparatus is now in condition for operation in the same manner as before the operating coil 239 of the relay 241 was energized.

In a manner similar to that just described, for locking the substation apparatus out of service, any feeder circuit or circuits may be disconnected from the distribution circuit 2 and reconnected thereto at any desired time. The feeder circuit 172 will be considered in this respect, and it is understood that each of the other feeder circuits may be controlled in the same manner. In order to disconnect the feeder circuit 172 from the distribution circuit 2, the proper code of impulses is transmitted to the selector switch to cause it to complete a circuit extending through the operating coil of the relay 223, thereby energizing this coil to effect engagement of the contact members 244.

This operation completes a circuit extending from the positive terminal 31 of the storage battery 32 through the switch 21, conductor 251, resistor 245, operating coil 246 of the relay 247, contact members 244, conductor 257, and switch 21 to the negative terminal 36 of the storage battery 32. The operating coil 246 is thereby energized to cause the relay 247 to effect disengagement of the contact members 179 and engagement of the contact members 248. The contact members 248 shunt the contact members 244, so that the circuit extending through the operating coil 246 will be maintained through the contact members 248 after the contact members 244 are disengaged.

The disengagement of the contact members 179 interrupts the circuit extending through the operating coil of the magnet-valve 176, thereby precluding energization of the coil of this magnet-valve, which precludes pneumatic closing of the circuit interrupter 174. This condition is maintained until it is desired to reconnect the feeder circuit 172 to the distribution circuit 2, when such a code of impulses is transmitted to the selector switch that it causes the operating coil of the relay 224 to be energized.

When the operating coil of this relay is energized, the contact members 249 are engaged, thereby close-circuiting the terminals of the operating coil 246, and shunting sufficient current around it to permit the relay 247 to effect engagement of the contact members 179 and disengagement of the contact members 248. The system is now in the same condition as before the coil 246 was energized.

In the schematic diagram shown in Figure 3, the same reference numerals have been used to designate various parts of the apparatus as in Figures 1 and 2.

It is understood that the system embodying my invention is not limited to the details of construction described herein, but numerous modifications may be made in the apparatus without departing from the scope or spirit of the invention, as set forth in the appended claims.

I claim as my invention:

1. In an electrical system, the combination with an alternating-current circuit, a direct-current circuit, and a converter, of electrically-controlled pneumatically-operated switches for connecting the converter between the alternating and direct-current circuits, a compressor for supplying pneumatic energy to the pneumatically-operated switches and means connected to the direct-current circuit for operating the compressor.

2. In an electrical system, the combination with an alternating-current circuit, a direct-current-circuit, a transformer and a converter, means comprising a plurality of electrically-controlled pneumatically-operated switches for connecting the converter to the alternating-current circuit through the transformer and for connecting the converter to the direct-current circuit in response to the development by the converter of a predetermined polarity and potential, a battery for supplying current to the control circuits of the electrically-controlled pneumatically-operated switches, and means supplied from the direct current circuit for supplying pneumatic energy to operate the pneumatically-operated switches.

3. In an electrical system, the combination with an alternating-current circuit, a direct-current circuit, a transformer and a converter, of means comprising a pneumatically-operated circuit interrupter for connecting the transformer to the alternating-current circuit, a second pneumatically-operated interrupter controlled by the closure of the first interrupter for connecting the converter to the relatively low-potential points on the transformer, a third pneumatically-operated interrupter controlled by the closure of the second interrupter for connecting the converter to relatively high-potential points on the transformer, means comprising pneumatically-operated means for connecting the converter to the direct-current circuit in response to the development by the converter of a predetermined polarity and potential, and automatic means supplied with energy from the direct-current circuit for maintaining a supply of pneumatic energy between predetermined limits of pressure.

In testimony whereof, I have hereunto subscribed my name this 28th day of September, 1923.

ROY J. WENSLEY.